United States Patent
Aizawa et al.

(10) Patent No.: US 8,597,390 B2
(45) Date of Patent: Dec. 3, 2013

(54) AIR CLEANER

(75) Inventors: Masao Aizawa, Kariya (JP); Daisuke Endo, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 724 days.

(21) Appl. No.: 12/042,565

(22) Filed: Mar. 5, 2008

(65) Prior Publication Data

US 2008/0216455 A1    Sep. 11, 2008

(30) Foreign Application Priority Data

Mar. 8, 2007    (JP) ................................. 2007-058386

(51) Int. Cl.
*B01D 46/00*    (2006.01)

(52) U.S. Cl.
USPC ............................................. 55/481; 55/506

(58) Field of Classification Search
USPC ........... 55/481, 478, 479, 480, 490, 492, 493, 55/495, 502, 504, 506, 529, 385.3, 508; 95/273–287; 123/198 E
See application file for complete search history.

(56) References Cited

U.S. PATENT DOCUMENTS

| | | | | |
|---|---|---|---|---|
| 4,312,645 A * | 1/1982 | Mavros et al. | ................... | 96/400 |
| 5,030,264 A * | 7/1991 | Klotz et al. | ....................... | 55/481 |
| 5,213,596 A * | 5/1993 | Kume et al. | ....................... | 55/481 |
| 5,295,602 A * | 3/1994 | Swanson | ........................ | 220/786 |
| 5,332,409 A * | 7/1994 | Dralle | ............................. | 55/484 |
| 5,569,311 A * | 10/1996 | Oda et al. | ......................... | 55/493 |
| 5,679,121 A * | 10/1997 | Kim | .................................. | 55/481 |
| 5,900,032 A * | 5/1999 | Wang | ............................ | 55/385.3 |
| 6,126,708 A * | 10/2000 | Mack et al. | ...................... | 55/502 |
| 6,231,630 B1 * | 5/2001 | Ernst et al. | .................... | 55/385.3 |
| 6,708,217 B1 * | 3/2004 | Colson et al. | ................. | 709/231 |
| 6,808,547 B2 * | 10/2004 | Ota et al. | ......................... | 55/478 |
| 7,294,161 B2 * | 11/2007 | Connor et al. | .................. | 55/498 |
| 7,323,027 B1 * | 1/2008 | Fu | .................................. | 55/385.6 |
| 7,351,270 B2 * | 4/2008 | Engelland et al. | .............. | 55/502 |

(Continued)

FOREIGN PATENT DOCUMENTS

| | | |
|---|---|---|
| JP | 6-007622 | 1/1994 |
| JP | 6-063857 | 9/1994 |

(Continued)

OTHER PUBLICATIONS

English language Abstract of JP 2000-130272.

(Continued)

*Primary Examiner* — Duane Smith
*Assistant Examiner* — Thomas McKenzie
(74) *Attorney, Agent, or Firm* — Greenblum & Bernstein, P.L.C.

(57) ABSTRACT

An air cleaner is provided with a housing having an opening, and a filter. The filter has a frame and an element supported to the frame. The filter is installed in the interior of the housing from the opening of the housing. A second seal surface of a seal ring of the filter is joined to a first seal surface of the housing in a state in which the filter is installed in the housing. A rib-shaped protection portion extending along the first seal surface is provided in the housing. The protection portion protrudes further toward the filter than the first seal surface. A slide protrusion protruding further toward the first seal surface than the second seal surface is provided in the frame of the filter. The slide protrusion can slide on the protection portion.

7 Claims, 9 Drawing Sheets

(56) References Cited

U.S. PATENT DOCUMENTS

| | | | |
|---|---|---|---|
| 7,628,416 B2 * | 12/2009 | Hara | 280/260 |
| 2002/0116909 A1 * | 8/2002 | Onoda | 55/498 |
| 2004/0020177 A1 * | 2/2004 | Ota et al. | 55/481 |
| 2006/0185333 A1 * | 8/2006 | Huehn et al. | 55/471 |
| 2008/0110146 A1 * | 5/2008 | Germain et al. | 55/385.3 |
| 2008/0250763 A1 * | 10/2008 | Widerski et al. | 55/357 |

FOREIGN PATENT DOCUMENTS

| | | |
|---|---|---|
| JP | 6-63857 | 9/1994 |
| JP | 8-121272 | 5/1996 |
| JP | 9-122417 | 5/1997 |
| JP | 11-132117 | 5/1999 |
| JP | 2000-045890 | 2/2000 |
| JP | 2000-130272 | 5/2000 |
| JP | 2001-329921 | 11/2001 |

OTHER PUBLICATIONS

English language Abstract of JP 9-122417.
English language Abstract of JP 6-63857.

* cited by examiner

AIR CLEANER

BACKGROUND OF THE INVENTION

The present invention relates to an air cleaner which is mounted to an engine compartment of a vehicle, is connected to an intake side of an engine, and is provided for removing dust contained in an intake air.

Conventionally, to reduce a space required at a time of attaching and detaching the filter within the engine compartment, there has been proposed a structure in which a filter is taken in and out along an axial direction with respect to the housing of the air cleaner, without opening and closing the housing.

For example, Japanese Laid-Open Patent Publication No. 2000-130272, Japanese Laid-Open Patent Publication No. 9-122417, and Japanese Laid-Open Utility Model Publication No. 6-63857 each disclose an air cleaner structured such as to allow a filter having a frame and an element supported to the frame to be taken in and out through an opening from an upper portion of a housing. In a state in which the filter is installed in the housing, a seal surface of the filter is joined to a seal surface of the housing.

In the structure described in Japanese Laid-Open Patent Publication No. 2000-130272, a rib protruding toward the seal surface of the housing than the seal surface of the filter is formed in a lower end of the frame of the filter. Since the rib is placed on the seal surface of the housing at a time of attaching and detaching the filter to and from the housing, the contact between the seal surface of the filter and the seal surface of the housing is suppressed. As a result, abrasion and deformation are prevented in the seal surface of the filter.

Further, in the structure described in Japanese Laid-Open Patent Publication No. 9-122417, a protrusion is located in an opposite side to the seal surface, in the lower end of the frame of the filter. Further, within the housing, there are formed an engagement groove portion engaging with the protrusion of the frame, and a guide wall for guiding the protrusion of the frame to the engagement groove portion. If the filter is inserted into the housing from the opening of the housing in a state of being inclined, the protrusion of the frame is moved along the guide wall of the housing so as to be engaged with the engagement groove portion. Thereafter, the filter is rotated from an inclined position to a vertical position around an engagement portion between the protrusion and the engagement groove portion, and the seal surface of the filter is joined to the seal surface of the housing.

Further, in the structure described in Japanese Laid-Open Utility Model Publication No. 6-63857, a protrusion protruding downward is formed in a lower end of the frame of the filter. An inclined surface is formed in a back surface of the protrusion. An engagement recess engaging with the protrusion of the frame is formed in a lower end of the housing. An inclined surface capable of engaging with the inclined surface of the protrusion of the frame is formed in the engagement recess. If the filter is inserted into the housing from the opening of the housing, the protrusion of the filter is engaged with the engagement recess of the housing. At this time, on the basis of the engagement between the inclined surface of the protrusion and the inclined surface of the engagement recess, the filter moves toward the seal surface of the housing, and the seal surface of the filter is joined to the seal surface of the housing.

However, in the conventional air cleaners, the following problems are generated. In the structured described in Japanese Laid-Open Patent Publication No. 2000-130272, the rib of the filter is placed on the seal surface of the housing at a time of attaching and detaching the filter to and from the housing. Accordingly, the seal surface of the housing tends to be damaged by the rib, and there is a risk that a defective seal is generated between the housing and the filter.

Further, in the structure described in Japanese Laid-Open Patent Publication No. 9-122417, the lower end of the seal surface of the filter slides with respect to the seal surface of the housing at a time of inserting the filter to the housing. Accordingly, each of the seal surfaces of the filter and the housing tends to be damaged.

Further, in the structure described in Japanese Laid-Open Utility Model Publication No. 6-63857, the protrusion only protrudes downward from the frame. In this structure, in the same manner as Japanese Laid-Open Patent Publication No. 9-122417, the seal surface of the filter slides on the seal surface within the housing at a time of attaching and detaching the filter to and from the housing. Accordingly, there is a risk that each of the seal surfaces of the filter and the housing is damaged and there is a risk that the defective seal is generated.

There is a case where the interior of the housing of the air cleaner comes to a negative pressure and the frame of the filter is bent inward, at a time of driving the engine. At this time, in the air cleaner described in each of the patent documents mentioned above, the seal portion of the filter is bent inward, the contact area with respect to the seal surface of the housing becomes small, and there is a risk that the seal portion of the filter comes off the seal surface of the housing. In this case, the defective seal is generated.

SUMMARY OF THE INVENTION

An objective of the present invention is to provide an air cleaner which avoids a defective seal.

DETAILED DESCRIPTION OF THE PREFERRED EMBODIMENTS

First Embodiment

A description will be given of a first embodiment in accordance with the present invention with reference to FIGS. 1 to 8.

Figure 1:
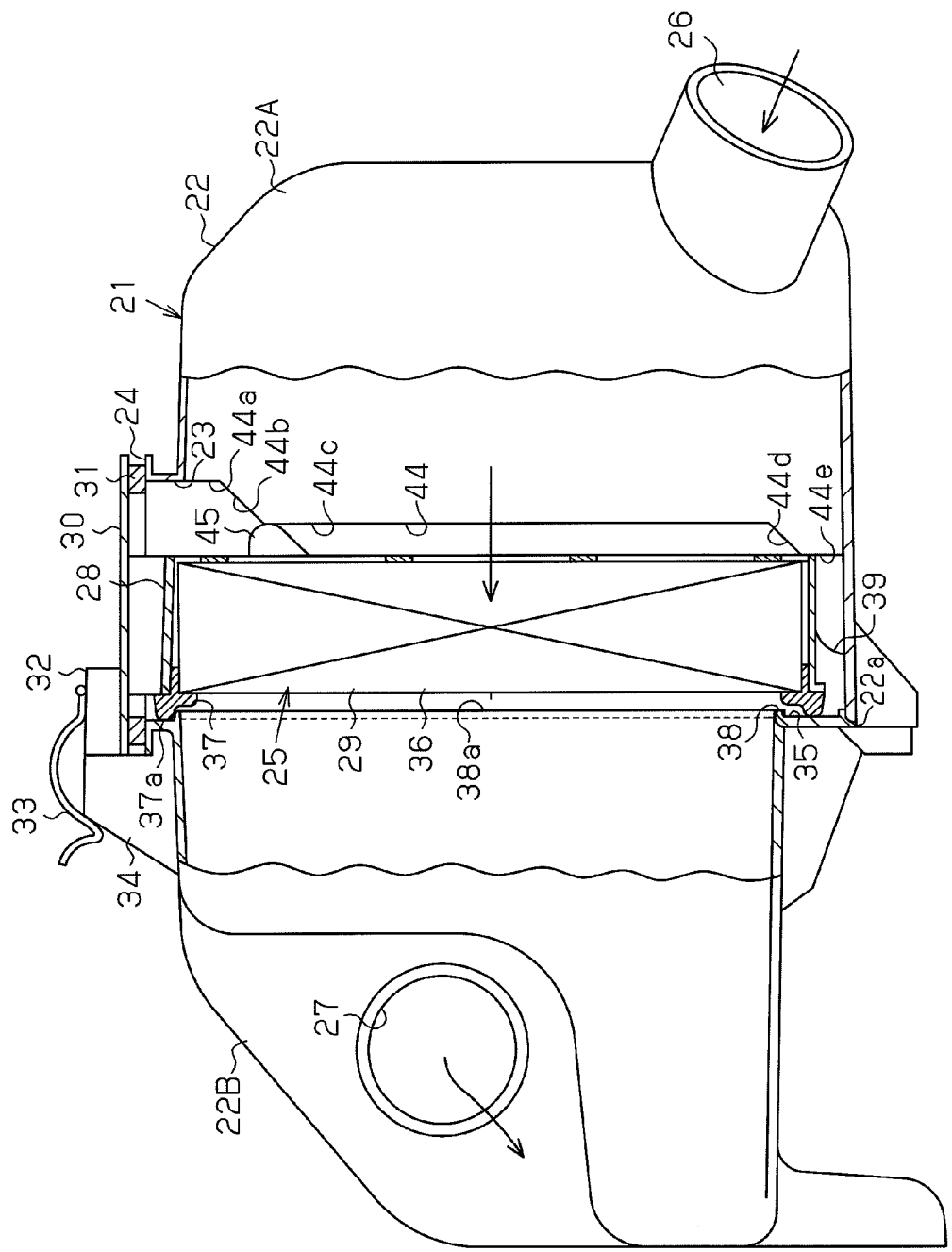
FIG. 1 is a cross-sectional view, with a part cut away, showing an air cleaner in accordance with a first embodiment as viewed from the front.

As shown in FIG. 1, an air cleaner 21 is installed to a corner portion or the like within an engine compartment of a passenger vehicle (not shown). The air cleaner 21 is connected to an intake side of an engine (not shown). At a time of driving the engine, the air cleaner 21 removes dust contained in an intake air. Further, the air cleaned by the air cleaner 21 is introduced to the intake side of the engine. A description will be in detail given below of a structure of the air cleaner 21 in accordance with the present embodiment.

Figure 2:
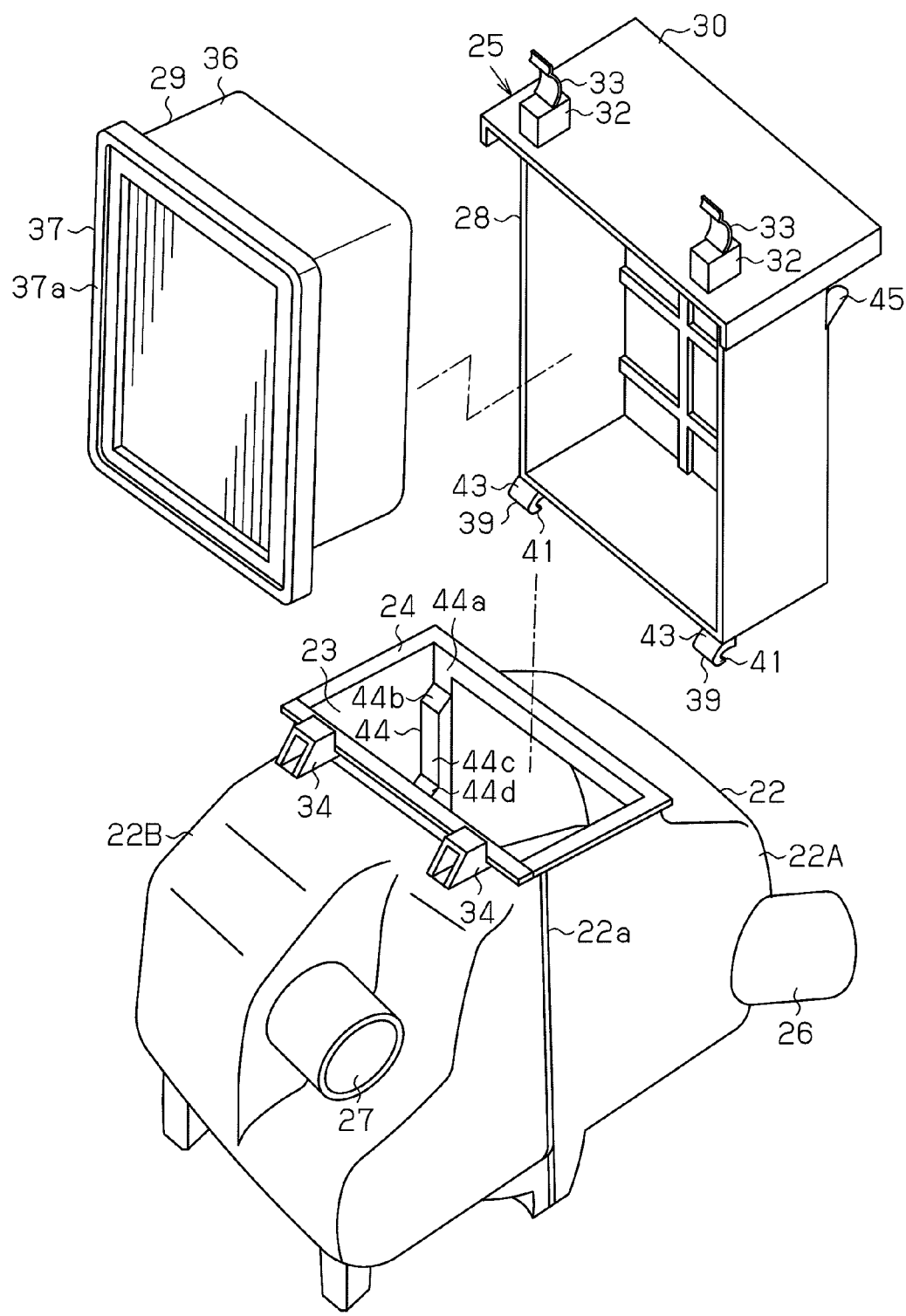
FIG. 2 is an exploded perspective view of the air cleaner.

As shown in FIGS. 1 and 2, the air cleaner 21 is provided with a substantially box-shaped housing 22. The housing 22 is constituted by a first housing 22A and a second housing 22B which are made of a synthetic resin. The first and second housings 22A and 22B are welded to each other in a welded portion 22a of an opposing opening end by means of a vibration welding or the like. An opening 23 is formed in an upper wall of the first housing 22A, in a joint portion between the first housing 22A and the second housing 22B. A flange-shaped seal surface 24 is formed in a peripheral edge of the opening 23. In the present embodiment, upper and lower sides in the drawing are defined as upper and lower sides of the air cleaner 21. The air cleaner 21 may be mounted within the engine compartment in an orientation which is 90 degrees or 180 degrees rotated from the illustrated direction. The mounted posture of the air cleaner 21 is not limited to the direction defined in the present embodiment.

A filter 25 is installed within the housing 22. The filter 25 is inserted into the housing 22 through the opening 23, or removed from the housing 22. In other words, the filter 25 can be attached to and detached from the housing 22. An inlet 26 for taking in atmospheric air is formed in a peripheral wall of the first housing 22A. The inlet 26 is provided at a position corresponding to one surface (a right side in FIG. 1) of the filter 25. An outlet 27 connected to an intake side of the engine is formed in a peripheral wall of the second housing 22B. The outlet 27 is provided at a position corresponding to the other surface (a left side in FIG. 1) of the filter 25. At a time of operating the engine, as shown by an arrow in FIG. 1, the air introduced into the first housing 22A from the inlet 26 is filtered by passing through the filter 25. The filtered air is introduced to the engine from the outlet 27 after flowing into the second housing 22B.

Figure 4:
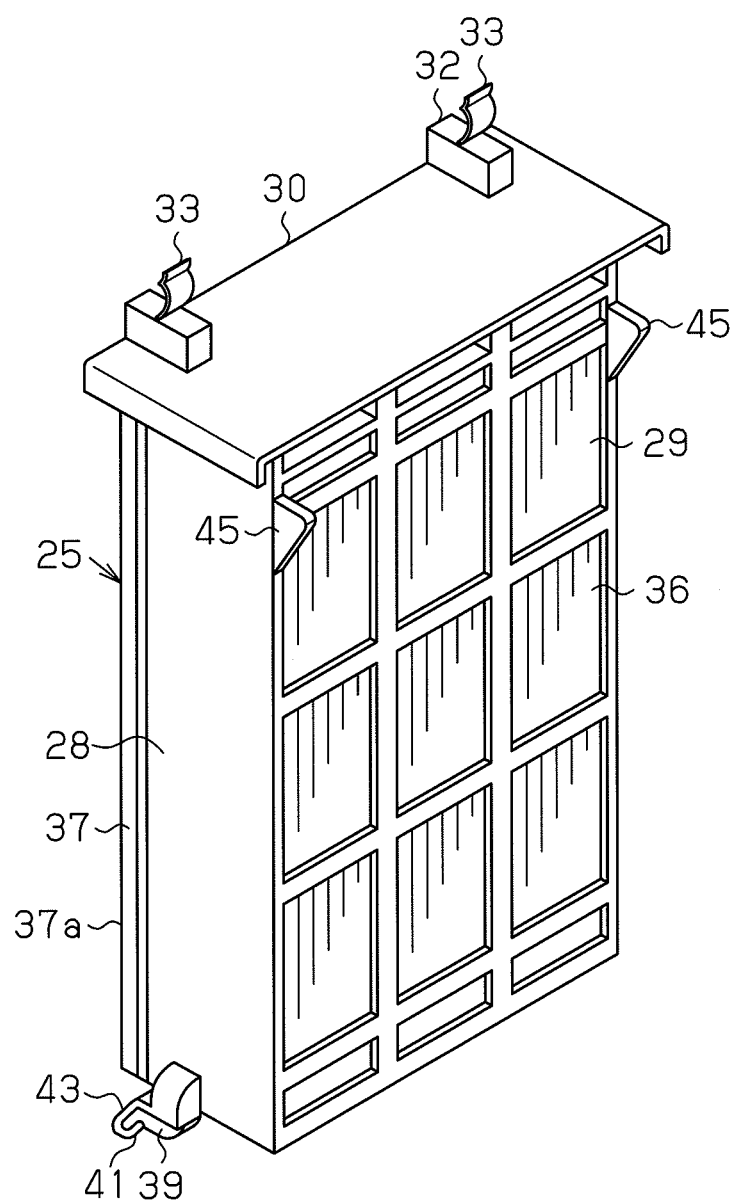
FIG. 4 is a perspective view showing a filter of the air cleaner.

As shown in FIGS. 1, 2 and 4, the filter 25 is constructed by a frame 28 made of a synthetic resin, and an element 29. The frame 28 is formed as a box shape in which both opposing surfaces are open. The element 29 is detachably supported within the frame 28. A lid plate 30 is integrally formed in an upper surface of the frame 28. A loop shaped seal member 31 is attached to a lower surface of the lid plate 30. As shown in FIG. 1, the seal member 31 is joined to the seal surface 24 of the opening 23 of the housing 22 in a state in which the filter 25 is installed to the housing 22. The opening 23 is sealed by the lid plate 30 in the manner mentioned above. The seal member 31 may be omitted.

Figure 8:
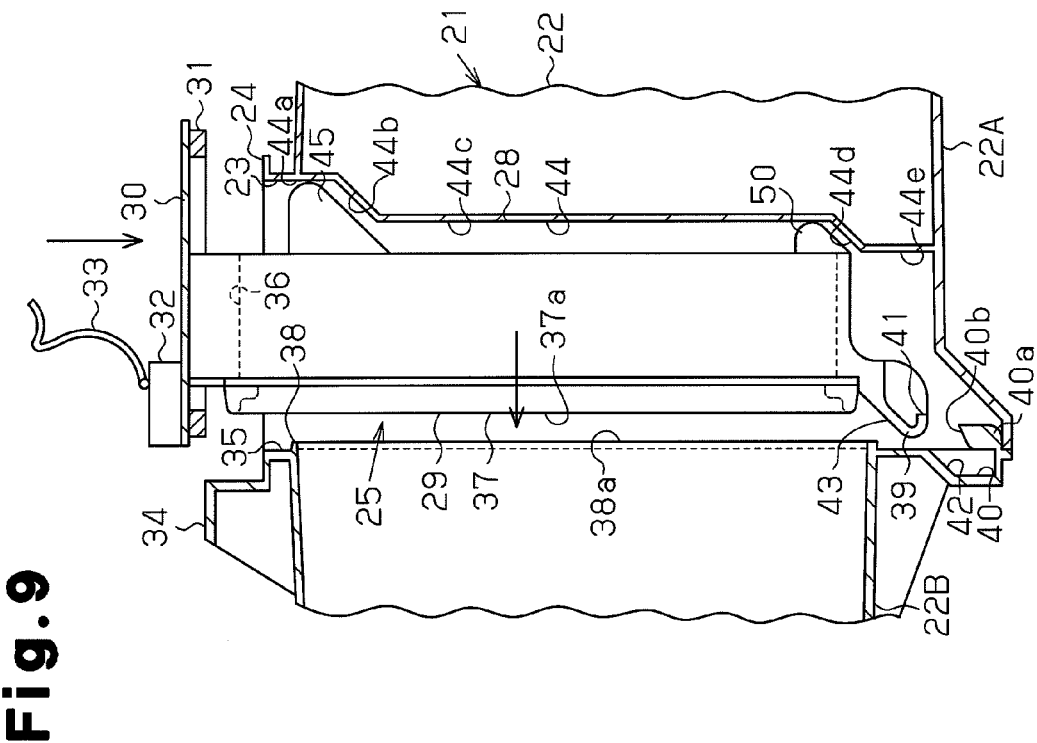
FIG. 8 is a partial cross-sectional view showing the installing process of the filter following FIG. 7.

As shown in FIGS. 1 and 2, a pair of attaching seats 32 protruding upward are formed in the upper surface of the lid plate 30 of the frame 28. A clamp member 33 is rotatably attached to each of the attaching seats 32. A pair of locking portions 34 protruding upward are formed on the second housing 22B. Each of the locking portions 34 is provided in such a manner as to correspond to each of the attaching seats 32 of the frame 28. As shown in FIGS. 1 and 8, both clamp members 33 are locked to the locking portions 34, whereby the filter 25 is retained in a state of being installed within the housing 22.

Figure 3:
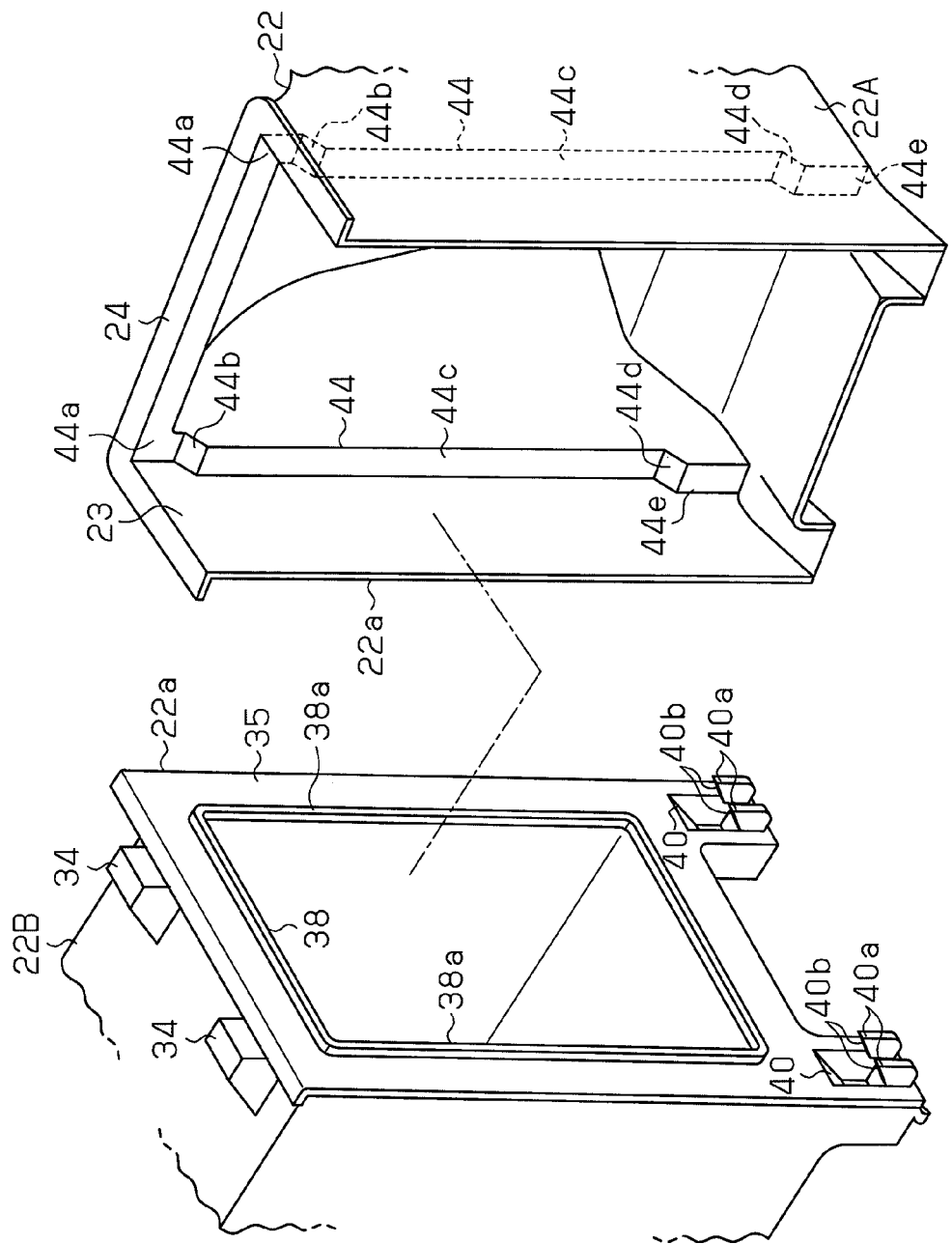
FIG. 3 is a perspective view showing a housing of the air cleaner in an exploded manner.

As shown in FIGS. 1 and 3, the welded portion 22a of the second housing 22B has a first seal surface 35 serving as a seal portion in a side facing the first housing 22A. The first seal surface 35 is formed as a rectangular loop.

In contrast, the element 29 is constituted by a filter member 36 and a seal ring 37 serving as a seal portion. The filter member 36 is folded like a pleat in such a manner as to form a pleat peak extending parallel to an inserting direction of the filter 25. The seal ring 37 is fixed to a peripheral edge of one end portion (a left end in FIG. 1) of the filter member 36. The seal ring 37 is made of polyurethane or the like, and is formed as a rectangular loop shape. A second seal surface 37a serving as the seal portion which can be joined to the first seal surface 35 of the second housing 22B is formed in a front surface of the seal ring 37. As shown in FIG. 1, in a state in which the filter 25 is installed to the housing 22, the second seal surface 37a on the seal ring 37 is joined to the first seal surface 35 of the second housing 22B.

As shown in FIGS. 1 and 3, a rib-shaped protection portion 38 is integrally formed in an inner edge portion of the first seal surface 35. The protection portion 38 extends in a loop along an opening end of the second housing 22B. The protection portion 38 protrudes further toward the filter 25 than the first seal surface 35 as well as extending along a whole periphery of the loop shaped first seal surface 35.

Figure 5:
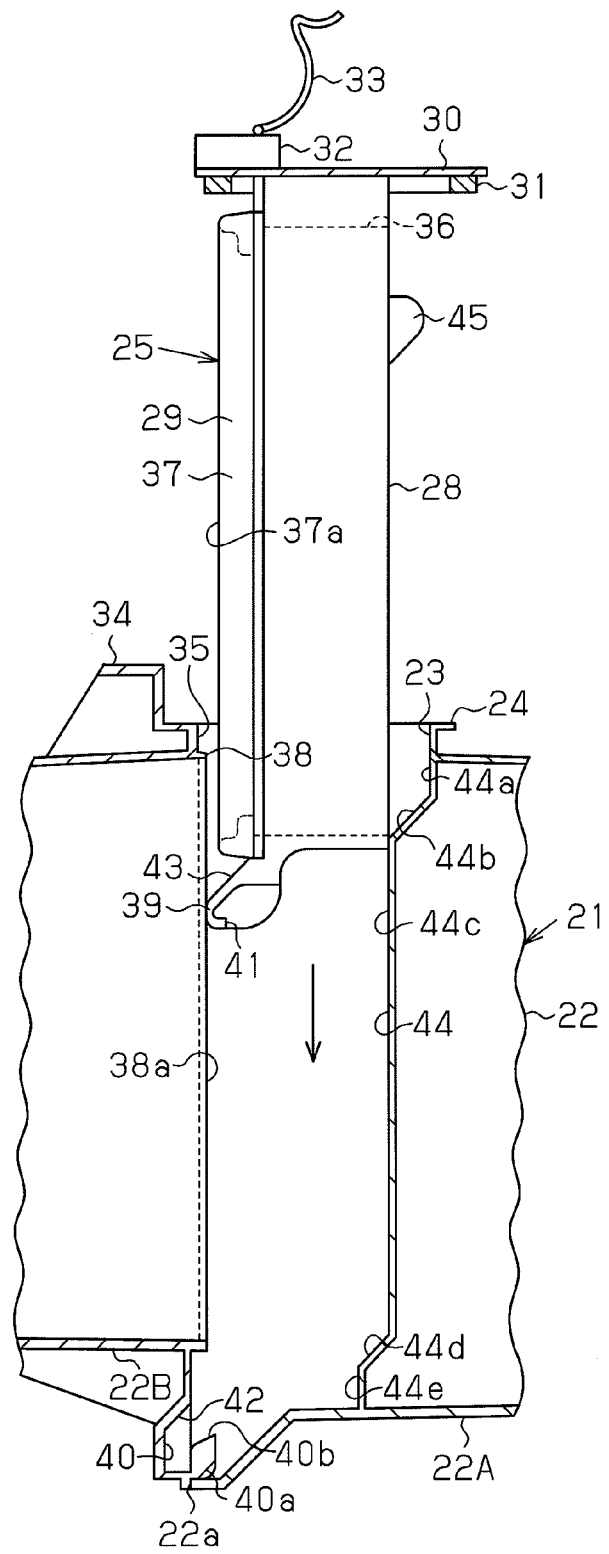
FIG. 5 is a partial cross-sectional view showing a process of installing the filter to the housing of the air cleaner.

In contrast, the protection portion 38 has a pair of long side portions 38a which are parallel to each other. Each of the long side portions 38a extends along the first seal surface 35 and along an attaching and detaching direction of the filter 25. A pair of slide protrusions 39 are formed in a lower end of the frame 28. Each of the slide protrusions 39 is provided in such a manner as to be capable of contacting the long side portion 38a of the protection portion 38. Each of the slide protrusions 39 protrudes further toward the first seal surface 35 than the second seal surface 37a on the seal ring 37. As shown in FIG. 5, at a time of attaching and detaching the filter 25 to and from the housing 22, the slide protrusion 39 slides on the long side portion 38a of the protection portion 38. Accordingly, it is possible to avoid the contact between the first seal surface 35 of the second housing 22B and the second seal surface 37a of the filter 25.

Figure 6:
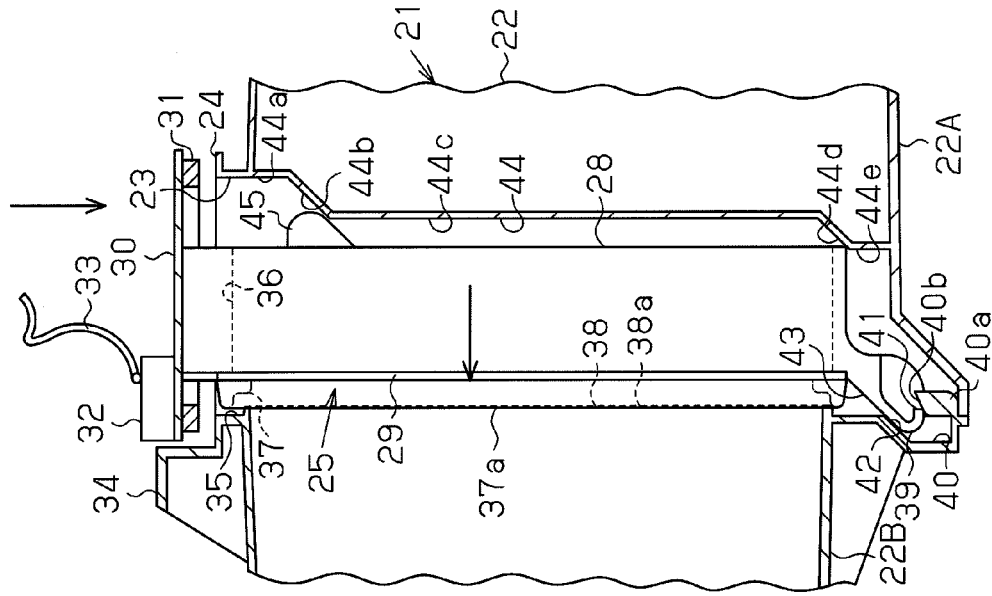
FIG. 6 is a partial cross-sectional view showing the installing process of the filter following FIG. 5.
Figure 7:
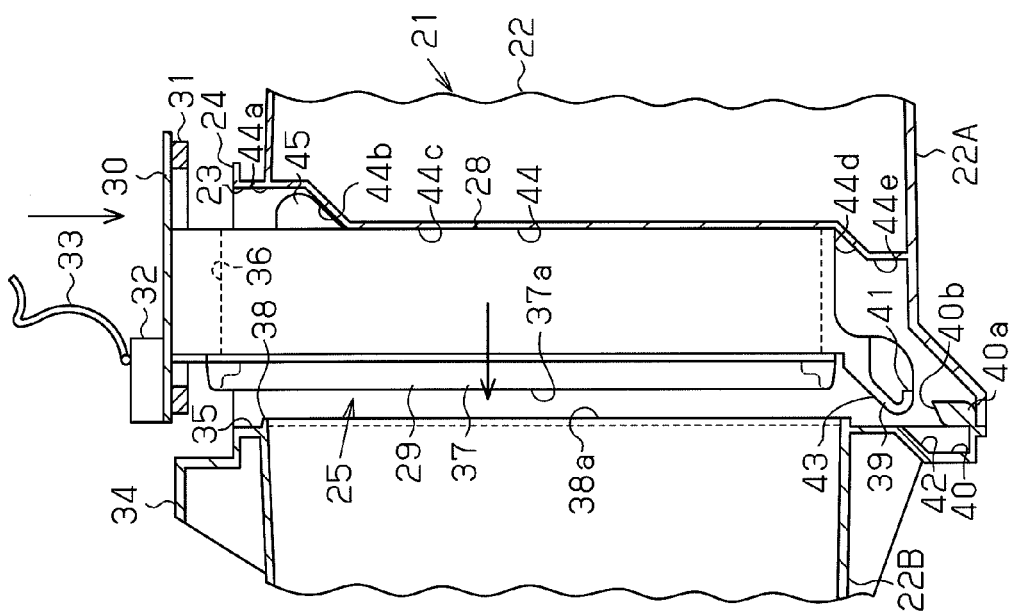
FIG. 7 is a partial cross-sectional view showing the installing process of the filter following FIG. 6.

As shown in FIGS. 3 to 5, a pair of recessed latch portions 40 are formed in a lower portion of the second housing 22B. Each of the latch portions 40 is provided at a position corresponding to the lower end of the long side portion 38a of the protection portion 38. A pair of projections 40a are respectively formed integrally in openings of the latch portions 40. An inclined surface 40b extending diagonally downward from an upper end of the projection 40a is formed in each of the projections 40a. The filter 25 has a pair of pawl-shaped latchable portions 41 in side surfaces of both slide protrusions 39. Each of the latchable portions 41 can be engaged with and disengaged from each of the latch portions 40 and the projections 40a. As shown in FIG. 8, when the filter 25 is inserted to the housing 22, both slide protrusions 39 of the filter 25 go into each of the latch portions 40 after being detached from the long side portion 38a of the protection portion 38. Further, the latchable portions 41 of both slide protrusions 39 are engaged with the inclined surfaces 40b of the projections 40a of the latch portions 40. On the basis of the engagement, as shown in FIGS. 6 to 8, the slide protrusion 39 is guided within the latch portion 40, and the filter 25 smoothly moves within the housing 22, and is installed within the housing 22.

As shown in FIGS. 4 and 5, an inclined surface 42 is formed in an inner surface of each of the latch portions 40. An inclined surface 43 is formed in the upper surfaces of both slide protrusions 39. Each of the inclined surfaces 43 of the filter 25 can be engaged with each of the inclined surface 42 of the second housing 22B. When the filter 25 is removed from the housing 22, a smooth movement of the filter 25 in a direction intersecting the slide direction of the filter 25 is allowed by each of the inclined surfaces 42 and 43, as shown in FIG. 7.

As shown in FIGS. 1 to 5, a pair of guide rail portions 44 extending in a vertical direction are formed in an inner surface of the first housing 22A. Each of the guide rail portions 44 is provided in correspondence to the opening 23 on the first housing 22A. A first vertical surface 44a, a first inclined surface 44b, a second vertical surface 44c, a second inclined surface 44d, and a third vertical surface 44e are formed in the order from the opening 23 to the lower end of the first housing 22A, in each of the guide rail portions 44. Further, the first vertical surface 44a, the first inclined surface 44b, the second vertical surface 44c, the second inclined surface 44d, and the third vertical surface 44e are formed in such a manner as to approach the second housing 22B toward the lower side. A pair of engagement projections 45 are provided in an opposite side to the seal ring 37, in the frame 28 of the filter 25. A distal end of each of the engagement projections 45 is formed as a circular arc shape. Each of the engagement projections 45 is formed at a position close to the lid plate 30 in the upper portion in both side edges of the frame 28. Each of the engagement projections 45 is provided in such a manner as to correspond to both guide rail portions 44 of the first housing 22A. In the present embodiment, guide means is constructed by the guide rail portion 44 and the engagement projection 45. Further, the guide surface is constructed by the first vertical surface 44a, the first inclined surface 44b, the second vertical surface 44c, the second inclined surface 44d, and the third vertical surface 44e.

As shown in FIGS. 5 to 8, when the filter 25 is inserted into the housing 22 from the opening 23, the lower end of the frame 28 is engaged with the second vertical surface 44c, the second inclined surface 44d, and the third vertical surface 44e of each of the guide rail portions 44 in the order. Subsequently, each of the engagement projections 45 of the frame 28 is engaged with the first vertical surface 44a, the first inclined surface 44b, and the second vertical surface 44c of each of the guide rail portions 44 in the order. On the basis of these engagements, the filter 25 is guided toward the first seal surface 35 of the second housing 22B at a time of inserting the filter 25 into the housing 22. On the basis of the guide mentioned above, the slide protrusion 39 of the filter 25 and the protection portion 38 of the second housing 22B are maintained in a contact state, and the seal surface 37a of the filter 25 is pressed against the seal surface 35 of the second housing 22B.

Next, a description will be given of an operation of the air cleaner 21 structured as mentioned above.

In the case of installing the filter 25 in the housing 22, the filter 25 is inserted into the housing 22 from the opening 23, as shown in FIG. 5. In accordance with this structure, both slide protrusions 39 of the filter 25 contact the long side portion 38a of the protection portion 38 of the second housing 22B, and slide on the contact surface with the long side portion 38a. In conjunction with this, the lower end of the frame 28 of the filter 25 is guided to the lower side while contacting the second vertical surface 44c so as to move, via the first inclined surface 44b of each of the guide rail portions 44 of the first housing 22A. Accordingly, it is possible to prevent a contact between the first seal surface 35 of the second housing 22B and the second seal surface 37a of the filter 25. Therefore, it is possible to prevent these seal surfaces 35 and 37a from being damaged.

As shown in FIG. 6, if the filter 25 is inserted into near the lower end of the housing 22, both slide protrusions 39 of the filter 25 are detached from the long side portion 38a of the protection portion 38 of the second housing 22B. Further, both slide protrusions 39 are arranged at the position corresponding to the latch portions 40 of the second housing 22B.

As shown in FIG. 7, if the filter 25 is further inserted into the housing 22, both engagement projections 45 of the filter 25 are engaged with the first inclined surfaces 44b of the guide rail portions 44 of the first housing 22A. In conjunction with this, the lower end of the frame 28 of the filter 25 is engaged with the second inclined surface 44d of each of the guide rail portions 44. Accordingly, a force moving the filter 25 to the first seal surface 35 of the housing 22 is applied to the filter 25. At the same time, the latchable portions 41 of both slide protrusions 39 are engaged with the inclined surfaces 40b of the projections 40a of the second housing 22B. Therefore, the movement of the second housing 22B toward the first seal surface 35 is allowed, and the second seal surface 37a of the filter 25 contacts the first seal surface 35 of the second housing 22B.

Thereafter, as shown in FIG. 8, if the filter 25 is inserted to a predetermined position within the housing 22, the latchable portion 41 is guided by the inclined surface 40b of the projection 40a, whereby the filter 25 is moved toward the second housing 22B. On the basis of this movement, the second seal surface 37a of the filter 25 is pressed against the first seal surface 35 of the second housing 22B. In other words, the latchable portion 41 is engaged with the inner surface of the projection 40a, and the second seal surface 37a is pressed against the first seal surface 35. At this time, the seal member 31 of the lid plate 30 is joined to the seal surface 24 of the housing 22. Further, the opening 23 is closed in an airtight manner by the lid plate 30.

Accordingly, in this state, both slide protrusions 39 of the filter 25 go into inner back portions of the respective latch portions 40 of the second housing 22B. Accordingly, a seal state between the first seal surface 35 and the second seal surface 37a is maintained. In this state, the filter 25 is retained in a state of being installed in the housing 22, by locking both clamp members 33 of the lid plate 30 to the locking portions 34 of the second housing 22B.

In contrast, in the case of taking out the filter 25 from the interior of the housing 22, the filter 25 can be removed from the opening 23 of the housing 22 by operating the filter 25 and the clamp member 33 in an inverse order to the operation mentioned above. In this case, both slide protrusions 39 of the filter 25 contact the long side portion 38a of the protection portion 38 of the second housing 22B, and slide on the contact surface with the long side portion 38a. Accordingly, the first seal surface 35 of the second housing 22B does not contact the second seal surface 37a of the filter 25.

In accordance with the air cleaner 21 of this embodiment, the following advantages are obtained.

(1) At a time of attaching and detaching the filter 25 to and from the housing 22, the slide protrusion 39 of the filter 25 slides on the protection portion 38 of the housing 22. Accordingly, it is possible to prevent the first seal surface 35 of the housing 22 from contacting the second seal surface 37a of the filter 25. Therefore, it is possible to avoid damage caused by the contact between the seal surfaces 35 and 37a of the housing 22 and the filter 25, and it is possible to prevent a defective seal from being generated. Accordingly, it is possible to suitably filter the air introduced into the air cleaner 21 so as to feed to the intake side of the engine.

(2) The protection portion 38 is constituted by the rib extending along the first seal surface 35. Accordingly, not only it is possible to prevent the first seal surface 35 of the housing 22 from contacting the second seal surface 37a of the filter 25 at a time of attaching and detaching the filter 25 to and from the housing 22, but also it is possible to smoothly move the slide protrusion 39 along the protection portion 38.

(3) The rib-shaped protection portion 38 is provided in an inner edge portion of the first seal surface 35. Accordingly, the protection portion 38 inhibits the seal ring 37 of the filter 25 from being bent inward by the negative pressure. Accordingly, it is possible to maintain a good contact state between the seal surfaces 37a and 35, and it is possible to effectively prevent the defective seal.

(4) Since the latchable portion 41 of the slide protrusion 39 is engaged with the latch portion 40 of the housing 22, the filter 25 is retained in a state of being installed in the housing 22. In this case, after the slide protrusion 39 is detached from the protection portion 38 at a time of inserting the filter 25, the second seal surface 37a of the filter 25 is joined to the first seal surface 35 of the housing 22. In this state, the latch portion 40 and the latchable portion 41 are engaged, and it is possible to retain the filter 25 within the housing 22. Accordingly, it is possible to well maintain the pressure contact state between the seal surfaces 37a and 35, in a state in which the filter 25 is installed to the housing 22.

(5) If the filter 25 is inserted into the housing 22, the latchable portions 41 of both slide protrusions 39 of the filter 25 are engaged with the inclined surface 40b of the projection 40a of the second housing 22B. Further, the filter 25 is smoothly guided toward the second housing 22B by the inclined surface 40b. As a result, the second seal surface 37a of the filter 25 is pressed against the first seal surface 35 of the second housing 22B, and the pressure contact state is maintained. The seal between the first seal surface 35 and the second seal surface 37a is maintained as mentioned above. In this case, the slide protrusion 39 is not warped by a corner in the opening of the latch portion 40 or the like. Accordingly, the filter 25 smoothly moves to the seal positions of both seal surfaces 35 and 37a.

(6) The guide rail portion 44 is provided within the housing 22. The engagement projection 45 or the like of the frame 28 of the filter 25 is engaged with the guide rail portion 44 at a time of inserting the filter 25. Accordingly, the filter 25 is guided toward the first seal surface 35 within the housing 22. Therefore, the second seal surface 37a of the filter 25 is suitably joined to the first seal surface 35 of the housing 22, at a time of inserting the filter 25. Further, the second seal surface 37a of the filter 25 quickly comes away from the first seal surface 35 of the housing 22, at a time of removing the filter 25.

Second Embodiment

Next, a description will be given of a second embodiment in accordance with the present invention while focusing on differences from the first embodiment.

Figure 9:
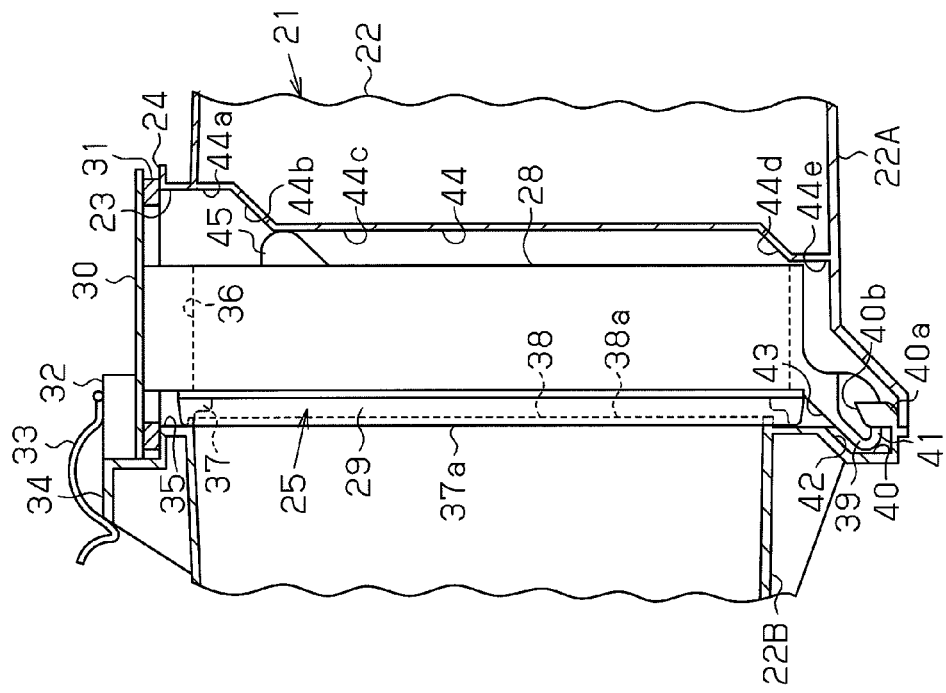
FIG. 9 is a partial cross-sectional view showing an installing process of a filter with respect to a housing of an air cleaner in accordance with a second embodiment.
Figure 10:
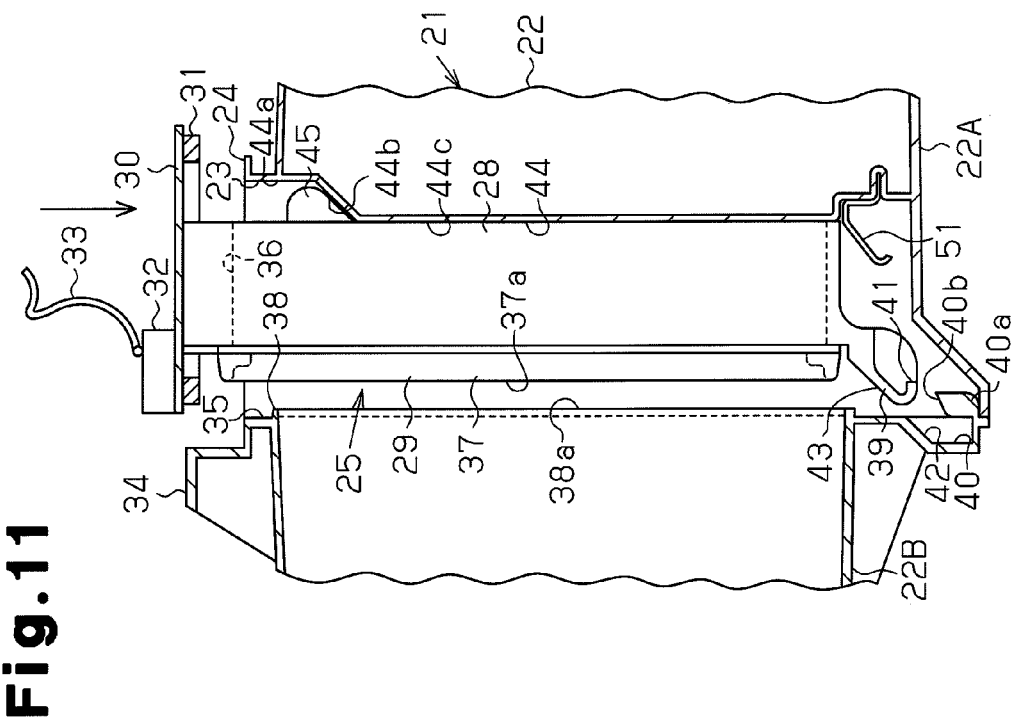
FIG. 10 is a partial cross-sectional view showing the installing process of the filter following FIG. 9.

As shown in FIGS. 9 and 10, the filter 25 has a pair of engagement projections 50 constructing a guide means, in a lower end of the frame 28. At a time of inserting the filter 25 into the housing 22, and removing the filter 25 from the housing 22, the engagement projection 50 contacts the guide rail portion 44 of the first housing 22A, that is, the second vertical surface 44c, the second inclined surface 44d and the third vertical surface 44e of the guide rail portion 44 so as to slide. Accordingly, it is possible to prevent rotation of the filter 25 in a direction away from the first seal surface 35 of the second housing 22B, during the sliding of the filter 25 along the guide rail portion 44. In other words, on the basis of the cooperation of the engagement between the engagement projection 45 near the lid plate 30 and the guide rail portion 44, and the engagement between the engagement projection 50 and the guide rail portion 44, the filter 25 moves along a direction intersecting the first seal surface 35 of the first housing 22A, and in a parallel state to the first seal surface 35. Accordingly, the second seal surface 37a of the filter 25 can be pressed against the first seal surface 35 of the second housing 22B, or can come away from the first seal surface 35.

Accordingly, in accordance with the second embodiment, it is possible to obtain substantially the same advantages as the advantages described in the first embodiment. Further, the following advantage is obtained in the second embodiment.

(7) It is possible to always keep the filter 25 in the parallel state to the first seal surface 35 at a time of attaching and detaching the filter 25. Accordingly, it is possible to smoothly attach and detach the filter 25 to and from the housing 22 without interfering with the housing 22.

Third Embodiment

Next, a description will be given of a third embodiment in accordance with the present invention while focusing on differences from the first embodiment.

Figure 11:
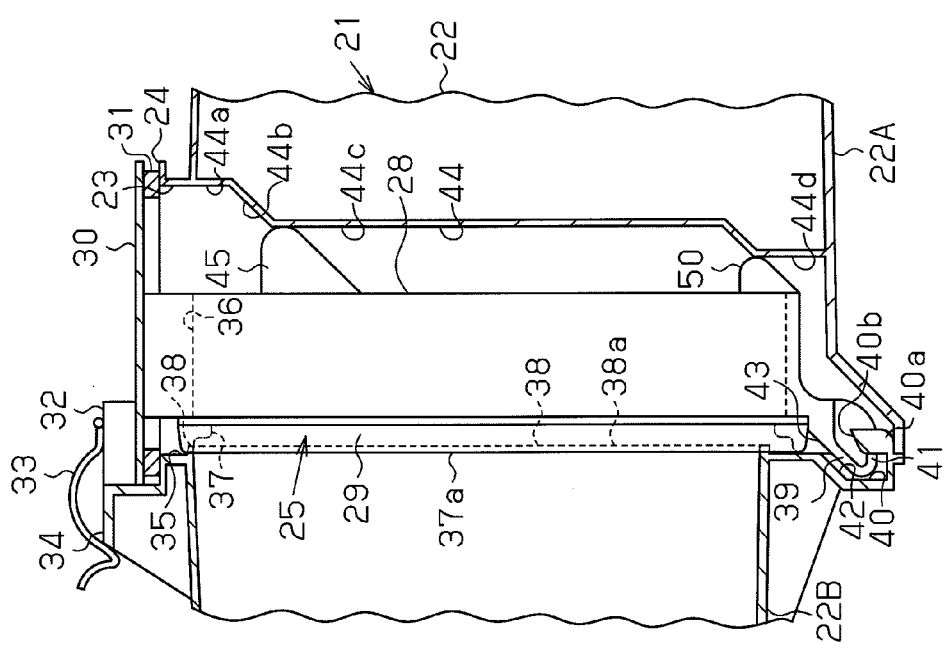
FIG. 11 is a partial cross-sectional view showing an installing process of a filter with respect to a housing of an air cleaner in accordance with a third embodiment.
Figure 12:
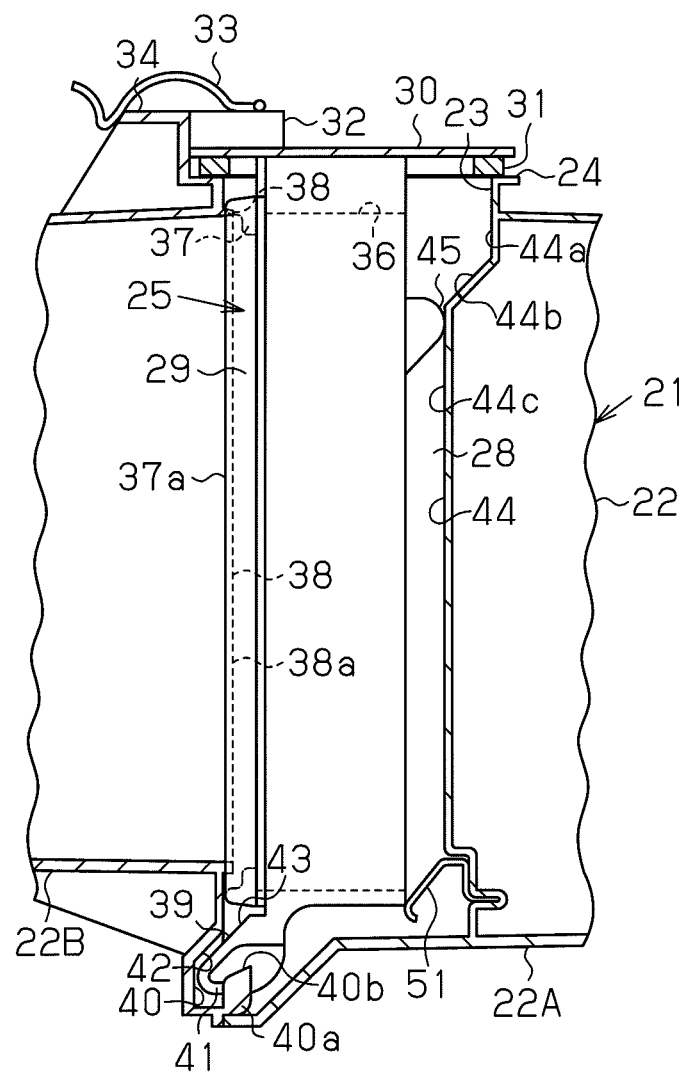
FIG. 12 is a partial cross-sectional view showing the installing process of the filter following FIG. 11.

As shown in FIGS. 11 and 12, in place of the second inclined surface 44d and the third vertical surface 44e of the guide rail portion 44 in accordance with the first embodiment, a pair of leaf springs 51 serving as guide means are provided in both side portions of the first housing 22A. Each of the leaf springs 51 can be engaged with the distal end of the frame 28 of the filter 25. At a time of installing the filter 25 to the housing 22, the lower end of the frame 28 is engaged with the leaf spring 51, and the filter 25 is moved toward the first seal surface 35 of the first housing 22A.

Therefore, in accordance with the third embodiment, it is possible to obtain substantially the same advantages as the advantages described in the first embodiment. Further, in accordance with the third embodiment, the following advantage is obtained.

(8) In the installed state of the filter 25, the leaf spring 51 can apply a load to the filter 25 in the joining direction of the seal surfaces 35 and 37a. In other words, the slide protrusion 39 can easily move into the latch portion 40 by using a spring force.

The illustrated embodiments may be modified as follows.

In each of the embodiments, the protection portion 38 is constituted by the rib extending in a loop along the whole periphery of the first seal surface 35. However, the protection portion 38 may be formed by a pair of ribs (only the long side portions 38a) extending along the vertical direction in the first seal surface 35.

In each of the embodiments, the engagement projection 45 or the engagement projection 50 may be constituted by a leaf spring having a similar outline shape thereto.

What is claimed is:

1. An air cleaner having a housing having an opening and a filter having a frame and an element supported to the frame, wherein the filter is attached to and detached from the housing through the opening, and a filter seal portion is joined to a housing seal portion in a state in which the filter is installed into the housing, the air cleaner comprising:

a protection portion provided in the housing and extending along the housing seal portion and along an attaching and detaching direction of the filter, the protection portion further protruding toward the filter than the housing seal portion in a direction generally parallel to an airflow direction of air to be passed through the filter; and a slide protrusion provided at a lower end of the frame and protruding further toward the housing seal portion than the filter seal portion, wherein the slide protrusion is slidable on the protection portion at a time of attaching and detaching the filter to and from the housing in a direction generally orthogonal to the airflow direction of air to be passed through the filter.

2. The air cleaner according to claim 1, wherein the protection portion is a rib, wherein the housing seal portion is formed in a loop in a joined portion to the filter within the housing, and wherein the protection portion is positioned in an inner edge portion of the housing seal portion so as to define a passage for filtered air to flow therethrough.

3. The air cleaner according to claim 1, further comprising:

a latch portion provided in an inner side of the housing; and a latchable portion provided in a frame of the filter and with which the latch portion of the housing is engaged, wherein the filter is retained in a state of being installed within the housing, on the basis of an engagement of the latch portion with the latchable portion.

4. The air cleaner according to claim 3, wherein the latch portion is provided at a position corresponding to a lower end of the protection portion, the slide protrusion is provided in a lower end of the frame of the filter, and the latchable portion is formed in the slide protrusion.

5. The air cleaner according to claim 1, further comprising:

a guide mechanism provided between the housing and the frame of the filter, wherein the guide mechanism allows the filter to move in a direction of joining the filter seal portion to the housing seal portion at a time of inserting the filter into the housing.

6. The air cleaner according to claim 5, wherein the guide mechanism is constituted by a guide surface provided in the housing, and an engagement projection provided in the filter and engaging with the guide surface of the housing, and wherein the engagement projection is provided in an opposite side to the housing seal portion in the frame of the filter.

7. The air cleaner according to claim 5, wherein the guide mechanism is constituted by a pair of guide rails provided in the housing and extending along a vertical direction, and a pair of engagement projections provided in the filter and engaging with the pair of guide rails.

* * * * *